J. C. JOHNSON.
BOLT AND NUT LOCK.
APPLICATION FILED JUNE 28, 1920.
1,380,387.
Patented June 7, 1921.
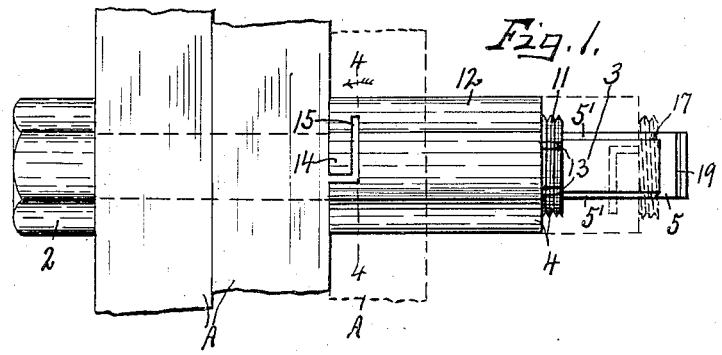
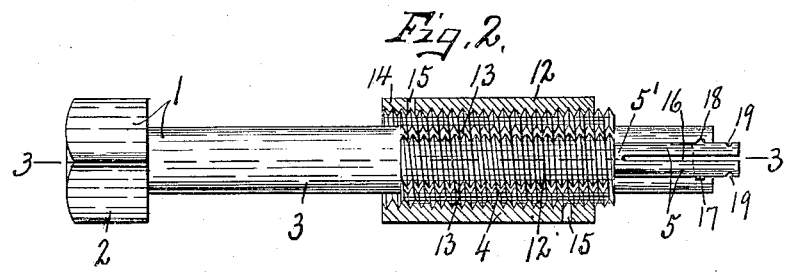
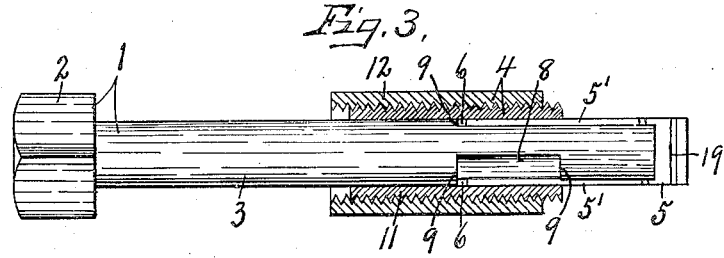
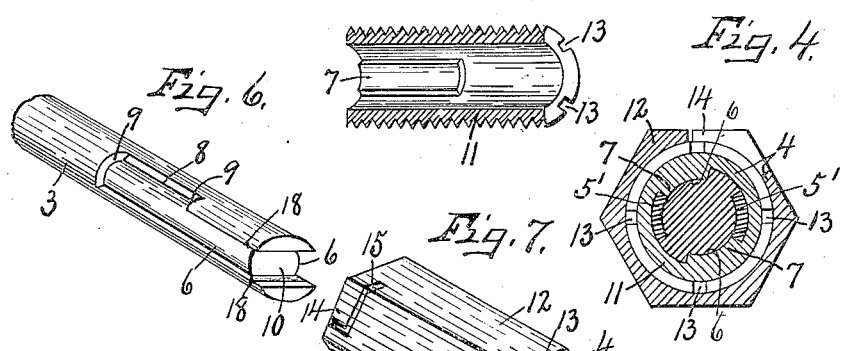
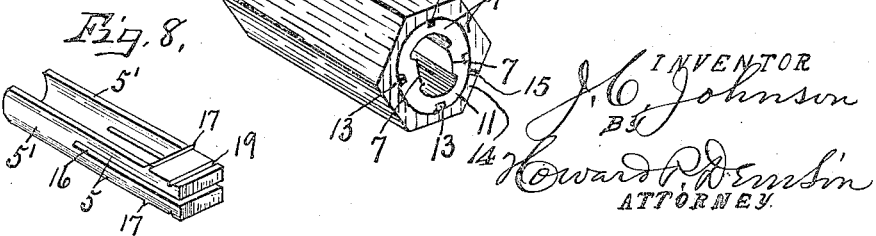
INVENTOR
J. C. Johnson
BY
Howard P. Denison
ATTORNEY.

UNITED STATES PATENT OFFICE.

JOHN C. JOHNSON, OF SYRACUSE, NEW YORK.

BOLT AND NUT LOCK.

1,380,387.  Specification of Letters Patent.  Patented June 7, 1921.

Application filed June 28, 1920. Serial No. 392,237.

*To all whom it may concern:*

Be it known that I, JOHN C. JOHNSON, a citizen of the United States, residing at Syracuse, in the county of Onondaga, in the State of New York, have invented new and useful Improvements in Bolt and Nut Locks, of which the following, taken in connection with the accompanying drawings, is a full, clear, and exact description.

This invention relates to a bolt and nut clamping device, the main object of which is to enable the nut and bolt to be easily and quickly assembled or detached one from the other by a slight relative turning movement of either without material, if any, relative turning of the thread engaging portions, and, at the same time, to permit the necessary close adjustment by the relative turning of the threaded portions.

Another object is to enable the same bolt and nut to be used for clamping two or more parts of widely varying thicknesses together by a slight relative turning movement of the threaded parts.

In other words, I have sought to enable the bolt and nut to be easily and quickly attached and detached or adjusted to work of widely varying thickness with a minimum amount of relative turning movement of the threaded parts one upon the other.

Other objects and uses relating to specific parts of the clamping device will be brought out in the following description.

In the drawings:

Figure 1 is a side elevation of my improved clamping device with two pieces of work clamped between the head of the bolt and nut, the nut being shown by dotted lines as adjusted for clamping a greater thickness of work, or a third piece of work, also shown by dotted lines.

Fig. 2 is a face view at right angles to that shown in Fig. 1 of the same device except that the work is omitted and the internally threaded nut section is shown in section.

Fig. 3 is a face view of the bolt and a sectional view of the nut in operative position upon the bolt.

Fig. 4 is an enlarged transverse sectional view of the same device taken on line 4—4, Fig. 1.

Fig. 5 is a sectional view of the externally threaded section or sleeve of the nut.

Figs. 6, 7 and 8 are perspective views, respectively, of one end of the bolt, the nut and the bolt and nut locking member.

This device is adapted to clamp two or more pieces of work, as —A—, and comprises a bolt —1— having an angular head —2— and a substantially cylindrical threadless shank —3— of any suitable length for receiving a nut —4— and locking member —5—.

The shank —3— of the bolt is provided with diametrically opposite peripheral grooves —6— extending a predetermined distance from the front end face toward the head a distance approximately equal to the length of the nut for receiving a pair of diametrically opposite lengthwise ribs —7— on the inner section of the nut —4—, and also for receiving the opposite arms of the U-shaped locking member —5—.

The inner ends of the grooves —6— are enlarged or widened circumferentially at —8— forming shoulders —9— at the ends of the enlargement, said shoulders being spaced apart a distance equal to one-half the lengths of the grooves, and, therefore, substantially half the length of the nut to receive the ribs —7— between them for holding the inner section of the nut against endwise movement when the locking member —5— is in place.

The front end of the shank of the bolt —3— is also provided with a diametrically extending groove or recess —10— registering with the adjacent ends of the grooves —6— for receiving the corresponding end of the locking member —5—.

The nut —4— consists of an inner externally threaded sleeve section —11— and an outer internally threaded section —12— of substantially the same length as the sleeve section and screwing thereon, the inner section being made in the form of a tube having the internal lengthwise ribs —7— of substantially the same or slightly less width circumferentially as that of the grooves —6— so that they may slide easily in said grooves when assembling the nut upon the shank of the bolt or displacing the same therefrom.

These ribs —7— extend inwardly from one end of the sleeve a distance substantially equal to half the length of the nut, or approximately the same or slightly less length than that of the enlarged portions —8— of the grooves —6— to permit said ribs to readily enter between the shoulders —9— by a slight turning movement of the sleeve after one or the other of the ends of the ribs have been brought into engagement with the inner shoulder —9— by the lengthwise movement of the sleeve on the shank of the bolt, thereby locking the sleeve and bolt against relative endwise movement, it being understood that the remaining portions of the bore of the sleeve are of substantially the same diameter as that of the shank of the bolt to allow the sleeve to slide freely on the bolt when the ribs —7— are registered with the reduced front ends of the groove —6—.

This construction of the ribs —7— and grooves —6— with the circumferential enlargement —8— constitute what may be termed a bayonet lock between the sleeve and shank of the bolt, the circumferential widths of the ribs —7— being substantially equal to that of the offset portions —8— of the grooves —6— so as to allow the opposite arms of the locking member —5— to pass through the narrower portions of the grooves and along the adjacent edges of the ribs —7— when the latter are in the offset portions —8—, or between the shoulders —9—, to coöperate with the opposite lengthwise walls of the said enlarged portions of the grooves in holding the sleeve against turning movement on the shank of the bolt.

The periphery of the sleeve —11— is provided with a series of, in this instance 4, relatively narrow lengthwise grooves —13— arranged in parallelism longitudinally and in uniformly spaced relation circumferentially to coöperate with yielding jaws —14— on the ends of the outer section —12— of the nut in holding said outer section against accidental loosening by unscrewing.

These jaws —14— are formed by providing the walls of the outer section —12— with angular slits —15— near the ends thereof, the free ends of the jaws being pressed inwardly slightly, or just sufficient to cause them to spring into the grooves —13— as they are successively registered therewith, the ends of the jaws being arranged diametrically opposite to each other so that both may engage opposite grooves —13— at the same time as the nut is tightened to hold the outer section of the nut against unscrewing upon the sleeve —11— while the sleeve is held against turning movement by the locking member —5—.

The head of the key —5— and adjacent portions of its opposite arms, as —5'—, are slotted along their longitudinal centers at —16— to render the opposite sides of the head and adjacent portions of the arms —5'— more or less resilient or free to be compressed toward each other, the outer faces of the resilient portions being provided with transverse ribs —17— which are adapted to enter transverse grooves —18— in the opposite walls of the recess —10— on the end of the shank —3— of the bolt when the locking member is placed in operative position in the grooves —6— and said recess, as shown more clearly in Fig. 2, to hold the locking member against accidental displacement.

The head of the locking member is somewhat longer than the slot —10—, and, therefore, protrudes some distance beyond the adjacent end of the bolt when adjusted for use and is provided with transverse grooves —19— adapted to be engaged by the fingers to assist in compressing the resilient portions of the head sufficient to withdraw the ribs —17— from the grooves —18— and to thereby permit the withdrawal of the locking member when it is desired to remove the nut.

The object in making the ribs —7— on the interior of the sleeve —11— of less length than that of the grooves —6— in the shank of the bolt is to permit the nut to be used with the same bolt for clamping widely different thicknesses of work between the head of the bolt, for example, if the sleeve is placed over and upon the ends of the bolt with the ribs —7— at the outer end and the inner ends of said rib engaged with the inner shoulder —9—, the inner end of the sleeve will extend a distance beyond the inner shoulder —9— a distance approximately equal to half its length, while, on the other hand, if the sleeve is reversed end for end and placed upon the bolt, the ends of the ribs —7—, which are flush with the inner end of the sleeve, will engage the inner shoulder —9— and thereby lengthen the distance between the head of the bolt and inner end of the sleeve a distance equal to the length of the ribs, and in either adjustment the sleeve is turned to bring the ribs —7— between the shoulder —9— or into the offset portion —8— of the groove —6— leaving space for the entrance of the opposite arms of the locking member —5— along the grooves as —6— at one side of the ribs —7— to hold the sleeve against turning movement and accidental endwise displacement, while the outer section —12— is free to screw upon the sleeve.

That is when the sleeve is locked in place upon the shank of the bolt by the locking member —5—, the outer section —12— is free to turn in one direction for clamping the work between its inner end and the head of the bolt, while the free ends of the jaws —14— engaging in the grooves —13— serve to lock the outer section —12— against loosening after it has been tightened.

If it is desired to remove the nut including the inner and outer sections —11— and —12—, it is simply necessary to withdraw the locking bolt —5— and to then turn the nut in the direction of unscrewing which withdraws the ribs —7— from the lateral branches —8— of the grooves —6—, whereupon the nut may be withdrawn endwise from the bolt, thus permitting the removal of the bolt from the work if desired.

If the thickness of the work to be clamped varies greatly from that previously clamped, the nut may be reversed end for end upon the bolt and locked thereto in the manner previously described to vary the distance between the inner end of the nut and head of the bolt between which the work is to be clamped, and if the jaws —14— are employed, it would be necessary to remove the inner section —11— from the outer section —12— before the inner sleeve is reversed and placed upon the bolt, whereupon the outer section —12— may be replaced upon the inner section by screwing until the work is firmly clamped in place, it being understood that in that case the outer section would not be reversed end for end.

What I claim is:

1. A bolt and nut clamping device comprising a bolt having a head and a threadless shank, an externally threaded sleeve slidable over and upon the shank, means for limiting the sliding movement of the sleeve toward the head, means for locking the sleeve against rotation on the shank, and an internally threaded nut section screwing upon the sleeve.

2. A bolt and nut clamping device comprising a bolt having a head and a threadless shank, said shank having a lengthwise groove extending from its front end face inwardly a distance considerably less than the length of the shank to form a shoulder at its inner end, a sleeve slidable lengthwise of and upon said shank and provided with an interior lengthwise rib nearer to one end than to its opposite end to enter the groove in the shank, said sleeve being reversible end to end on the shank to cause either end of the rib to engage the inner wall of the groove for varying the distance between the inner end of the sleeve and head of the nut when the parts are adjusted for use, means for locking the sleeve against turning movement on the shank and an internally threaded nut section screwing upon the sleeve.

3. A bolt and nut clamping device comprising a bolt having a head and a threadless shank, said shank having a lengthwise groove in its periphery extending inwardly from its front end a distance less than the length of the shank to form a shoulder at its inner end, the inner end of said groove being enlarged circumferentially to form a shoulder at the outer end of the enlargement, an externally threaded sleeve slidable lengthwise of and upon the shank and provided with an internal lengthwise rib of approximately the length of the enlargement and slidable in the groove by endwise movement of the sleeve and into the enlargement by turning movement of the sleeve to hold said sleeve against endwise movement on the shank, means for locking the sleeve against turning movement, and an internally threaded nut section screwing upon the sleeve.

4. A bolt and nut clamping device comprising a bolt having a head and a shank, an externally threaded sleeve slidable lengthwise of and upon the shank, means for limiting the endwise movement of the sleeve toward the head of the bolt, means for locking the sleeve against turning movement on the shank of the bolt, and an internally threaded nut section screwing upon the sleeve.

5. A bolt and nut clamping device comprising a bolt having a head and a shank, an externally threaded sleeve slidable endwise of and upon the shank of the bolt and having an independent rotary adjustment thereon, means for limiting the rotary adjustment of the sleeve, additional means for holding the sleeve against endwise movement when adjusted rotarily in one direction to the limit of its adjustment, means for holding the sleeve against rotary adjustment in the opposite direction, and an internally threaded nut section screwing upon the sleeve.

In witness whereof I have hereunto set my hand this 19th day of June, 1920.

JOHN C. JOHNSON.

Witnesses:
H. E. CHASE,
ROSE G. CARROLL.